United States Patent [19]

Kishida et al.

[11] Patent Number: 4,504,608
[45] Date of Patent: Mar. 12, 1985

[54] FLAME RETARDANT POLYESTER RESIN COMPOSITIONS

[75] Inventors: Kazuo Kishida; Isao Sasaki, both of Hiroshima; Hiroshi Mori, Yamaguchi, all of Japan

[73] Assignee: Mitsubishi Rayon Co. Ltd., Tokyo, Japan

[21] Appl. No.: 461,228

[22] Filed: Jan. 26, 1983

[30] Foreign Application Priority Data

Feb. 4, 1982 [JP] Japan ................... 57-16685

[51] Int. Cl.$^3$ .................... C08L 67/02; C08L 63/02
[52] U.S. Cl. ............................. 523/444; 523/460; 523/461; 523/466; 524/101; 524/411; 524/412; 524/445; 524/447; 524/448; 524/449; 524/451; 524/605
[58] Field of Search ............ 524/101, 409, 605, 451, 524/411, 412; 523/444, 460, 461

[56] References Cited

U.S. PATENT DOCUMENTS

| | | | |
|---|---|---|---|
| 3,950,306 | 4/1976 | Pews | 524/101 |
| 3,965,212 | 6/1979 | Kamada | 524/409 |
| 4,020,122 | 4/1977 | Borman | 525/438 |
| 4,039,538 | 8/1977 | Klinkenberg | 524/101 |
| 4,123,415 | 10/1978 | Wambach | 524/451 |
| 4,140,669 | 2/1979 | Phipps | 524/451 |
| 4,140,671 | 2/1979 | Cohen | 524/451 |
| 4,187,377 | 2/1980 | Narisawa | 524/605 |
| 4,221,893 | 9/1980 | Behar | 524/409 |
| 4,229,553 | 10/1980 | Sterzel | 525/438 |
| 4,295,886 | 10/1981 | Gresham | 524/605 |
| 4,344,878 | 8/1982 | Dolce | 524/409 |
| 4,373,047 | 2/1983 | Cohen | 524/451 |

Primary Examiner—John C. Bleutge
Assistant Examiner—Patricia Short
Attorney, Agent, or Firm—Cushman, Darby & Cushman

[57] ABSTRACT

Flame retardant reinforced with polyester resin compositions are disclosed glass fiber and a system of flame retardants represented by the following general formulas (I) and (II), together with antimony trioxide. The flame retardant system is a blend of 1-20 parts by weight of component (I), and 2-30 parts by weight of component (II), provided the weight ratio (I)/(II) of the flame retardant component (I) to (II) is in the range of $0.2 < (I)/(II) < 4$, and that the total amount of flame retardants (I) plus (II) is in the range of 3-40 parts by weight. From 2 to 30 parts by weight of antimony trioxide is present and 5 to 60% by weight of glass fiber is also present, these two percentages being expressed on the basis of the weight of the total resin composition. The resin compositions exhibit outstanding mechanical, thermal properties and moldability in addition to being fire retardant.

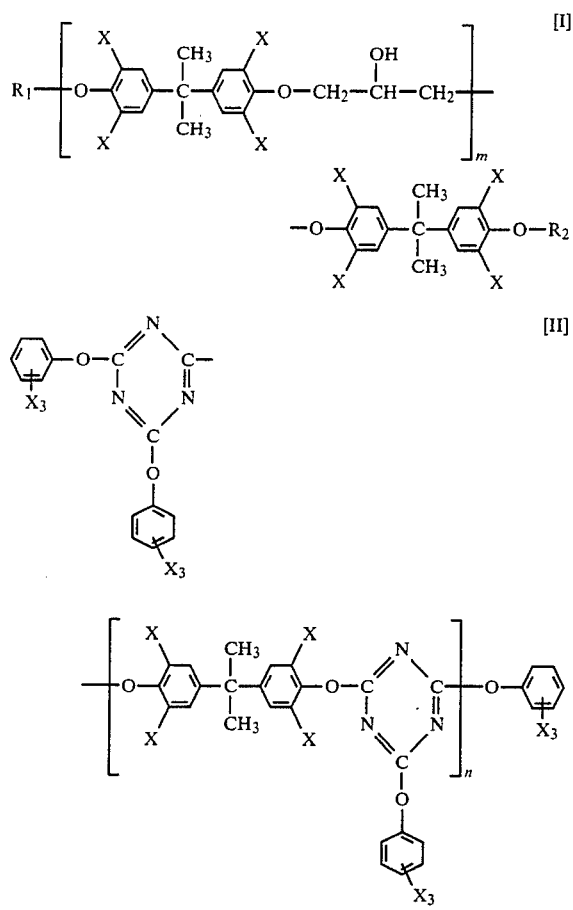

in which X is hydrogen, chlorine or bromine, m has an average value from 0 to 11, n has an average value from 0 to 7 and the halogen content is 10% or more by weight. Values for $R_1$ and $R_2$ are given in the attached specification.

10 Claims, No Drawings

FLAME RETARDANT POLYESTER RESIN COMPOSITIONS

BACKGROUND OF THE INVENTION

1. Field of the Invention

This invention relates to flame retardant polyester resin compositions reinforced with glass fiber having outstanding mechanical and thermal properties as well as good moldability.

2. Description of the Prior Art

Glass fiber reinforced products produced with polyethylene terephthalate resin have been used in numerous applications as a type of engineering plastic. Such reinforced resins are known for their outstanding mechanical and thermal properties, and chemical resistance as well as good moldability.

However, the glass fiber reinforced polyester resin has the distinct disadvantage of flammability, as do other synthetic resins. Accordingly flame retardancy is an important property for engineering plastics.

Normally untreated polyethylene terephthalate resin products reinforced with glass fiber require a comparatively high molding temperature, for example in the range of about 250° to 300° C. This means that the heat resistance of a flame retardant is important. This means one must use flame retardants that will be hardly decomposed at the high temperature. Further, they must not impart color to nor deteriorate the resin properties in the ultimately molded products. Since glass fiber reinforced polyethylene terephthalate resin products have a high heat distortion temperature, they are typically used in comprehensive applications exposed to high temperature, for example in electric appliances and the like. Accordingly, the successful flame retardation of polyester resin/glass fiber reinforced products, as mentioned above, requires the molded articles to be thermally stable. That is, they should be free from deterioration in their flame retardant properties due to heat dissipation if the finished products are exposed to high temperature over long term operations while still providing the required basic properties which include flame retardance, mechanical strength, heat resistance and the like.

We previously found that the flame retardant represented by the general formula (II), described below, is excellent in the heat resistance and flame retardancy and we tried to improve the flame retardancy of glass fiber reinforced polyethylene terephthalate resin products by incorporating this flame retardant together with antimony trioxide into glass fiber reinforced polyethylene terephthalate resin composition. However, further investigations have revealed that if it is intended to obtain a high flame retardance by incorporating a large amount of the flame retardant represented by the general formula (II) into glass fiber reinforced polyethylene terephthalate resin products, the mechanical strength is reduced and also the moldability (the cut-off property at the time of extrusion) is degraded.

SUMMARY OF THE INVENTION

Our continued investigation into ways for improving the above-mentioned disadvantages have led us to the present invention, by discovering the fact that a flame retardant polyethylene terephthalate resin composition, exhibiting outstanding mechanical properties and adaptability to the extrusion, can be produced without reduction of thermal properties and flame retardancy by adding specific amounts of at least two flame retardants, each having specific structures, to the glass fiber-containing polyethylene terephthalate resin, together with a given amount of antimony trioxide. Adding a given amount of various inorganic materials to this composition further improves the resin composition's flame retardancy.

One embodiment of the present invention resides in a flame retardant polyester resin composition that is composed of a polyethylene terephthalate resin, glass fiber, and a three-part flame retardant system or composition represented by the below-displayed general formulas (I) and (II), together with antimony trioxide, where the flame retardant system is a blend of about 1 to 20 parts by weight of at least one compound of formula (I) together with a blend of about 2 to 30 parts by weight, respectively, of at least one compound of formula (II) per 100 parts by weight of the polyethylene terephthalate resin. The flame retardant system is composed such that the weight ratio (I)/(II) of the said flame retardants (I) to (II), is in the range of $0.2 < (I)/(II) \leq 4$ and that the total amount of the said flame retardant (I) and (II) is in the range of 3 to 40 parts by weight, in addition to antimony trioxide present in an amount of 2 to 30 parts by weight per 100 parts by weight of polyethylene terephthalate resin. Glass fiber is also present in the composition in an amount of about 5 to about 60% by weight of the total resin composition volume.

According to another embodiment of our invention the flame retardant polyester resin composition additionally contains at least one inorganic compound in an amount of about 1 to about 40% by weight, provided that the total amount of the glass fiber plus inorganic compound is no more than 60% by weight of the composition.

Compound (I) has the following general formula:

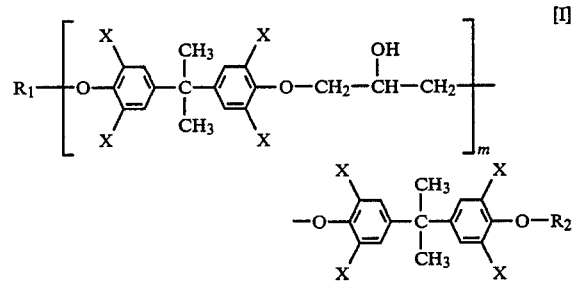

in which X is hydrogen, chlorine or bromine and m has an average value of 0–11. The halogen content is at least 10% by weight of the component. $R_1$ and $R_2$ may be the same or different, and both have the definition (1), (2), (3) or (4), given below:

(1) a glycidyl group
(2) a reaction product of a glycidyl group with an alcohol, a halogenated alcohol, an amine, a halogenated amine, an organic carboxylic acid or a halogenated organic carboxylic acid;
(3) a hydrocarbon containing up to 30 carbon atoms or a halogenated hydrocarbon also containing up to 30 carbon atoms; or
(4) an ester residual group —$COR_3$ in which $R_3$ represents a hydrocarbon containing up to 30 carbon atoms or a halogenated hydrocarbon also containing up to 30 carbon atoms.

The second component of the flame retardant system (II) has the following formula:

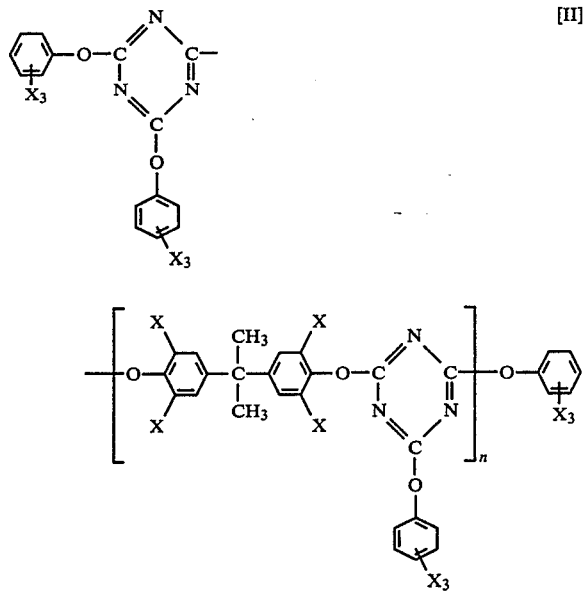

in which X is hydrogen, chlorine or bromine and n has an average value of 0–7. The halogen content is at least 10% by weight of the component.

The characteristic feature of the present invention is that by incorporating the flame retardants represented by the above-mentioned formulas (I) and (II), all present in the above-mentioned amounts, a well-balanced resin composition having heat resistance and flame retardancy comparable to those of a resin composition using the flame retardant represented by the general formula (II) and being excellent in the mechanical properties and moldability is obtained. Another feature of our invention is the fact that the addition of an inorganic compound in a predetermined volume contributes to the improvement in flame retardancy of the resulting composition, particularly in the so-called drop-preventing effect during the course of combustion.

DETAILED DESCRIPTION OF THE INVENTION

Polyethylene terephthalate resins used in accordance with the present invention include a linear polyester composed of ethylene terephthalate units as the main structural units, as well as linear copolyester consisting of small amounts of copolymerized polyhydric alcohols, aromatic dicarboxylic acids, aliphatic dicarboxylic acids and the like, mixtures of other thermoplastic resins composed mainly of these polyester or copolyesters. It is ordinarily preferred that the intrinsic viscosity [η] of the above-mentioned linear polyester or linear copolyester resin component be in the range of from 0.4 to 1.5 measured at 25° C. in a mixed solvent containing equal weights of tetrachloroethane and phenol.

There are no particular restrictions on the type of glass fibers used in this invention, both the roving type and chopped strand type are quite satisfactory. For productivity considerations the chopped strand is preferred. From the viewpoint of operability in the mixing process, as well as frictional wear of the molding machine and the breakage of glass fiber during the course of the formation process, we prefer a glass fiber product about 0.4 to about 6 mm in length, and most preferably the glass fiber will have a length of about 0.2 to about 2.0 mm in the ultimately molded products. Commercially available glass fibers, which may have been given various treatments, are conveniently used as is. The amount of the glass fiber included is about 5 to about 60% by weight of the total resin composition which is composed polyethylene terephthalate resin, glass fiber, flame retardants and antimony trioxide. Addition of glass fiber in an amount less than 5% by weight provides little reinforcement while an amount exceeding 60% by weight is not desirable since it contributes to deterioration of the moldability from the viewpoint of the flow processability.

The flame retardants used in the present invention are normally represented by the general formulas (I) and (II). One of the most important factors is that general formula (I), which represents the average degree of polymerization of the flame retardant, should be up to 11. Blends having more than this level of polymerization are not desirable since it contributes to deterioration of the resin properties because it interferes with uniform dispersion of the flame retardant into the resin compositions. For the same reason, it is important that n in the general formula (II) should be up to 7. If the halogen content in each of these flame retardants fails to reach 10% by weight, an excessively small blending amount of the flame retardant makes it difficult to attain sufficient flame retardancy while an excessively high blending amount lowers the resin properties, leading to an undesirable lowered drip-resistance.

Specific examples of the flame retardants represented by the general formula (I) are as follows:

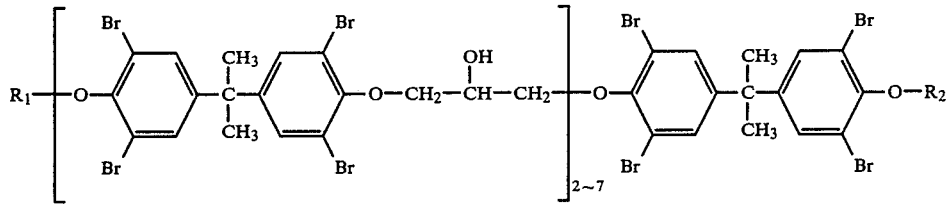

which for convenience may be abbreviated to $R_1$-Z-$R_2$. The $R_1$ and $R_2$ substituents may independently be represented by one of the following compounds:

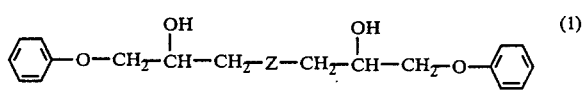

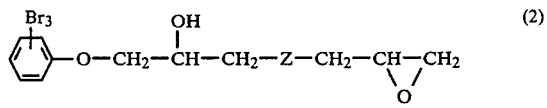

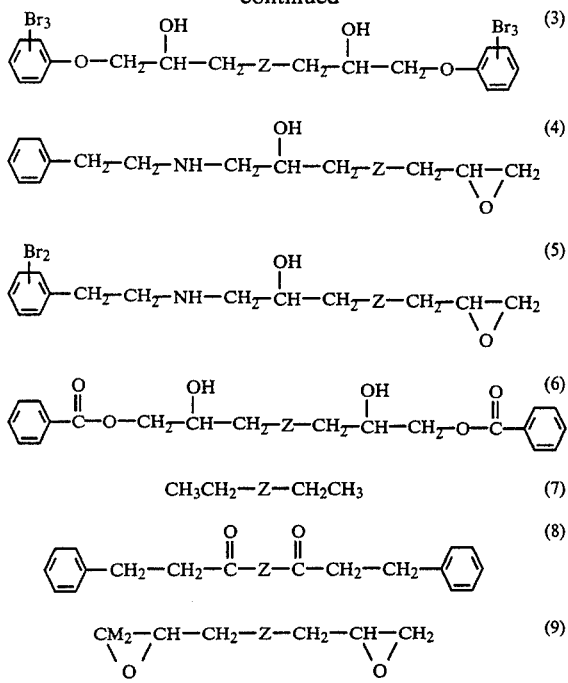

Specific examples of the flame retardant represented by the general formula (II) are as follows:

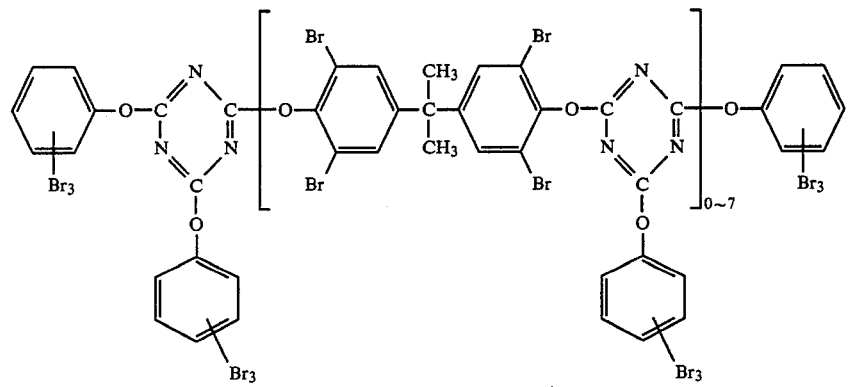

According to the present invention, the amounts of the individual flame retardant components blended into the flame retardant system as represented by the general formulas (I) and (II), are as follows:

per 100 parts by weight of polyethylene terephthalate resin 1-20 parts by weight: a flame retardant represented by formula (I)

2-30 parts by weight: a flame retardant represented by formula (II)

with the proviso that the flame retardant weight ratio of (I)/(II) is in the range of $0.2 < (I)/(II) \leq 4$ and further that the total of flame retardants (I) plus (II) is within the range of about 3 to about 40 parts by weight.

The weight ratio and overall total of components (I) and (II) are interrelated. As an example in the case where the total of flame retardants (I) and (II) is comparatively large but still within the specified total, it is desirable to adjust the ratio of (I)/(II) to be in the range of from 0.5 to 3.

Subsequently, in the present invention, it is necessary that antimony trioxide, which is used together with the above-mentioned flame retardants, should be present in the range of about 2 to about 30 parts by weight, preferably about 3 to about 20 parts by weight, per 100 parts by weight of polyethylene terephthalate resin. The antimony trioxide blend present in an amount exceeding 30 parts by weight is not desirable since it deteriorates the mechanical strength of the resin composition. The quantity of the antimony trioxide component of the composition is adjusted in accordance with the overall volume of the other two components of the 3 components flame retardant system. In the case when the above-mentioned flame retardant volume is comparatively low, it is recommended to increase the antimony trioxide volume within the range of this invention, or, in the case when the above-mentioned flame retardant volume is comparatively high, it is recommended to decrease the antimony trioxide volume within the range of this invention.

In the present invention, it is possible to enhance the flame retardancy and drip-resistance by blending at least one inorganic compound into the above-mentioned flame retardant polyester resin composition. While there is no particular restriction on the inorganic compound, so long as the inorganic compound is operative, we recommend silicic acid or a silicate including talc, kaolin, wollastonite, silica, mica, diatomaceous earth, ground quartz, clay, white carbon and the like. Of these specifically mentioned compounds, talc is effective in improving the moldability while white carbon is particularly recommended because of its outstanding improvement in the drip-resistance of the compositions. It is possible to include these inorganic compounds either alone or in combination of two or more types, within the range of about 1 to about 40% by weight of the total resin composition. Only a slight improvement can be expected in drip-resistance if the inorganic compound added is less than 1% by weight. It is also necessary that the blending is carried out so that the total of the glass fiber plus inorganic compound contains no more than 60% by weight of the total resin composition.

Preparation of the fire retardant glass fiber reinforced polyester resin composition of the present invention is carried out, for example, by mixing together well dried chips or particles of the polyethylene terephthalate resin, together with glass fiber, the required flame retardants represented by the general formulas (I) and (II), antimony trioxide and optionally an inorganic compound, all present within the above-stated quantities, and uniformly blending these component together in a V-blender. The blend is then melted extruded of processed according to conventional procedures. Alternatively the polymer, flame retardants and antimony trioxide, optionally inorganic compound are first melted and mixed together to form a blend and then added with the glass fiber to the molten mixture.

The resin compositions of the present invention may also include conventional additives and modifiers as are used in the art. These include light stabilizers, heat stabilizers, dyestuffs, pigments, crystal nucleating agents and other conventional additives.

The present invention will be further described in the following examples. Unless otherwise indicated, all parts and percentages are by weight and all temperatures are reported in degrees centigrade.

60 seconds except that it was 120 seconds in Comparative Example 3. The mechanical properties and flame retardancy were all evaluated using the test pieces as described above.

The moldability was evaluated based on the adaptability to the above-mentioned extrusion operation.

Table 1 reports the results of this evaluation and series of tests. Table 1 also indicates the flexural strength on the basis of ASTM D-638. Flame retardancy measurements were made on the basis of the flammability test of Underwriters' Laboratories, Inc. (UL-94) in which the flammability tests were repeated 10 times using five sampes 127 mm × 12.7 mm × 1.5 mm.

The following formulas represent the types (A) and (B) of the flame retardants shown in Table 1:

Retardant (A):

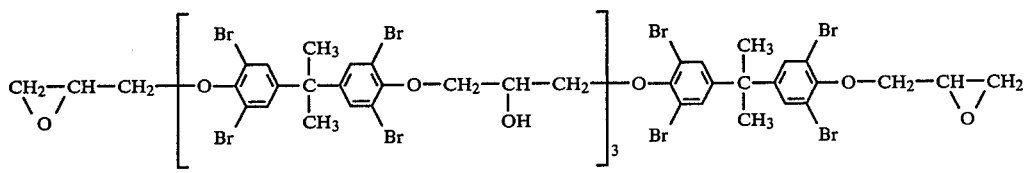

Retardant (B):

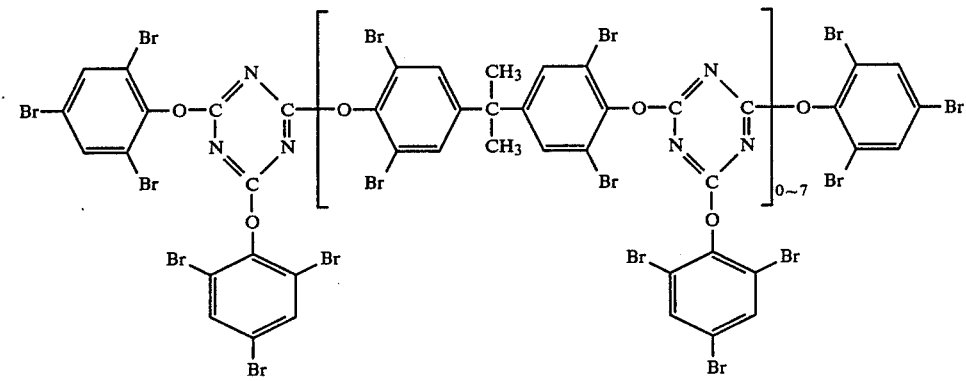

EXAMPLES 1 THROUGH 7 AND COMPARATIVE EXAMPLES 1 THROUGH 4

Sodium benzoate, glass fiber chopped strand 3 mm length, the flame retardant components, antimony trioxide and an inorganic compound are added to well dried polyethylene terephthalate (abbreviated as PET) resin whose intrinsic viscosity is 0.72 when measured at 25° C. in a mixed solvent containing equal weights of tetrachloroethane and phenol. The amounts that were added are shown in Table 1, and then uniformly blended for five minutes in a V-blender.

The blend as prepared above is extruded by means of 40 mm$\phi$ vented extruder at the cylinder temperature of 260°–280° C. to form pellets. These pellets are then injection molded in a screw type injection molding machine at a cylinder temperature is 280° C. and mold temperature, 80° C., and formed into test pieces 3.2 mm for flexural strength and pieces 1.5 mm thick for burning tests. In each run, the injection molding cycle was As shown in Table 1, it is important in polyethylene terephthalate resin series, from moldability and mechanical properties viewpoint, that the flame retardants represented by general formulas (I) and (II) are blended together in specific proportions. This data also demonstrates that inorganic compound blending tends to improve drip resistance in the flame resistance.

In Comparative Example 3, the melt viscosity actually tends to increase at the molding operation such as injection molding or extruding molding. Consequently a short shot is liable to cause in several shots. Therefore, the composition according to Comparative Example 3 is inferior in the moldability and processability.

Also in Comparative Example 4, the melt viscosity actually tends to increase at the molding operation such as injection molding or extruding molding. Consequently a short shot is liable to cause in several shots. Therefore, the composition according to Comparative Example 4 is inferior in the moldability and processability.

TABLE 1

|  |  |  | Example 1 | Example 2 | Example 3 | Example 4 | Example 5 | Example 6 |
|---|---|---|---|---|---|---|---|---|
| Composition | PET | Part by weight | 100 | 100 | 100 | 100 | 100 | 100 |
|  | Glass fiber | Parts by weight | 56 | 49 | 56 | 55 | 62 | 64 |

TABLE 1-continued

|   |   |   |   |   |   |   |   |   |
|---|---|---|---|---|---|---|---|---|
|   | Sodium benzoate | Parts by weight | 0.1 | 0.1 | 0.1 | 0.1 | 0.1 | 0.1 |
|   | Flame retardant | Type | (A)/(B) | (A)/(B) | (A)/(B) | (A)/(B) | (A)/(B) | (A)/(B) |
|   |   | Part by weight | 10/10 | 3/3 | 7/14 | 15/4 | 15/20 | 10/10 |
|   | Antimony trioxide | Part by weight | 10 | 8 | 10 | 10 | 10 | 10 |
|   | Inorganic compound | Type | — | — | — | — | — | talc |
|   |   | Part by weight | — | — | — | — | — | 20 |
| Moldability | Cut-off Property at Extrusion |   | good | good | good | good | good | good |
|   | Breakage of Strand at Extrusion |   | not observed | not observed | not observed | not observed | not observed | not observed |
|   | Flexural strength | kg/cm$^2$ | 2,030 | 2,150 | 1,980 | 2,080 | 2,010 | 1,910 |
| Flame retardancy | Drip frequency | Times | 5 | 9 | 5 | 5 | 3 | 1 |
|   | Cotton inflammation frequency | " | 0 | 0 | 0 | 0 | 0 | 0 |
|   | Average combustion time | Seconds | 2.8 | 3.9 | 2.5 | 2.6 | 1.9 | 1.5 |
|   | Conclusion |   | V-0 | V-0 | V-0 | V-0 | V-0 | V-0 |

|   |   |   | Example 7 | Comparative Example 1 | Comparative Example 2 | Comparative Example 3 | Comparative Example 4 |
|---|---|---|---|---|---|---|---|
| Composition | Pet | Part by weight | 100 | 100 | 100 | 100 | 100 |
|   | Glass fiber | Part by weight | 57 | 56 | 57 | 57 | 58 |
|   | Sodium benzoate | Part by weight | 0.1 | 0.1 | 0.1 | 0.1 | 0.2 |
|   | Flame retarant | Type | (A)/(B) | (B) | (A)/(B) | (A)/(B) | (A) |
|   |   | Part by weight | 10/10 | 20 | 2/20 | 20/2 | 25 |
|   | Antimony trioxide | Part by weight | 10 | 10 | 10 | 10 | 10 |
|   | Inorganic compound | Type | white carbon | — | — | — | — |
|   |   | Part by weight | 4 | — | — | — | — |
| Moldability | Cut-off Property at Extrusion |   | good | bad | bad | good | good |
|   | Breakage of Strand at Extrusion |   | not observed | often observed | often observed | not observed | not observed |
|   | Flexural strength | kg/cm$^2$ | 1,900 | 1,680 | 1,700 | 1,830 | 1,800 |
| Flame retardancy | Drip frequency | Times | 0 | 4 | 5 | 5 | 5 |
|   | Cotton inflammation frequency | " | 0 | 0 | 0 | 0 | 0 |
|   | Average combustion time | Seconds | 1.3 | 2.6 | 2.4 | 3.6 | 3.3 |
|   | Conclusion |   | V-0 | V-0 | V-0 | V-0 | V-0 |

What is claimed is:

1. A flame retardant glass fiber reinforced polyester resin composition comprising:

A. 100 parts by weight of polyethylene terephthalate resin;

B. from about 1 to about 20 parts by weight of a first flame retardant component of the formula (I);

C. from about 2 to about 30 parts by weight of a second flame retardant component of the formula (II);

provided that the first and second fire retardant components are blended together so that the weight ratio of (I)/(II) is in the range of 0.2 < (I)/(II) ≦ 4, and further that the total of the first and second flame retardant components (I) and (II) is from about 3 to about 40 parts by weight;

D. from about 2 to about 30 parts by weight of antimony trioxide, and

E. from about 5 to about 60 percent by weight of glass fiber based upon the total amount of the resin composition, the first flame retardant component is represented by the formula (I):

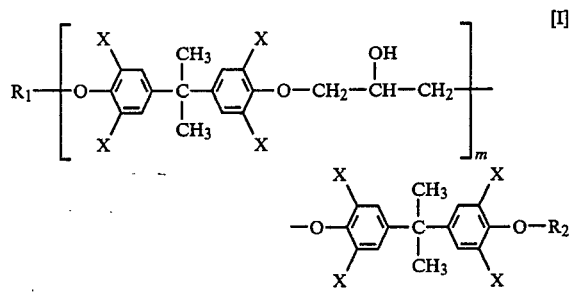

in which X represents hydrogen, chlorine or bromine and m has an average value from 0 to 11 and the halogen content is at least 10 percent by weight of the component, and $R_1$ and $R_2$ are both glycidyl groups; and the second flame retardant component is represented by the formula (II);

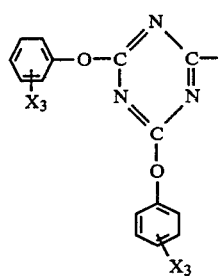

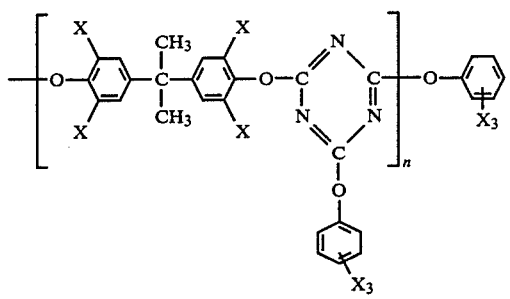

in which X represents hydrogen, chlorine or bromine and n has an average value from 0 to 7 and the halogen content is at least 10 percent by weight of the component.

2. The flame retardant glass fiber reinforced polyester resin composition of claim 1 further including:

F. from about 1 to about 40 percent by weight of an inorganic compound based upon the total amount of the resin composition;
provided that the total of the glass fiber and the inorganic compound is no more than 60 percent by weight of the total resin composition.

3. The flame retardant glass fiber reinforced polyester resin composition of claim 1 or 2 in which the glass fiber is chopped strand-type glass fiber.

4. The flame retardant glass fiber reinforced polyester resin composition of claim 1 or 2 in which the fiber length of the glass fiber is about 0.4 to about 6 mm.

5. The flame retardant glass fiber reinforced polyester resin composition of claim 1 or 2 in which the polyethylene terephthalate resin has an intrinsic viscosity $[\eta]$ of about 0.4 to about 1.5.

6. The flame retardant glass fiber reinforced polyester resin composition of claim 1 or 2 in which the weight ratio of (I)/(II) is in the range of $0.5 \leq (I)/(II) \leq 3$.

7. The flame retardant glass fiber reinforced polyester resin composition of claim 1 or 2 in which the amount of antimony trioxide is from about 3 to about 20 parts by weight.

8. The flame retardant glass fiber reinforced polyester resin composition of claim 2 in which the inorganic compound is silicic acid, a silicate or mixtures thereof.

9. The flame retardant glass fiber reinforced polyester resin composition of claim 8 in which the inorganic compound is talc, kaolin, wollastonite, silica, mica, diatomaceous earth, ground quartz, clay, white carbon or mixtures thereof.

10. The flame retardant glass fiber reinforced polyester resin composition of claim 8 in which the inorganic compound is talc, white carbon or their mixture.

* * * * *